(12) United States Patent
Nagaoka et al.

(10) Patent No.: US 10,415,448 B2
(45) Date of Patent: Sep. 17, 2019

(54) EXHAUST GAS CLEANING SYSTEM FOR INTERNAL COMBUSTION ENGINE AND EXHAUST GAS CLEANING METHOD FOR INTERNAL COMBUSTION ENGINE

(71) Applicant: ISUZU MOTORS LIMITED, Tokyo (JP)

(72) Inventors: Daiji Nagaoka, Fujisawa (JP); Masashi Gabe, Tokyo (JP)

(73) Assignee: ISUZU MOTORS LIMITED, Tokyo (JP)

( * ) Notice: Subject to any disclaimer, the term of this patent is extended or adjusted under 35 U.S.C. 154(b) by 375 days.

(21) Appl. No.: 15/321,464

(22) PCT Filed: Jun. 4, 2015

(86) PCT No.: PCT/JP2015/066189
§ 371 (c)(1),
(2) Date: Dec. 22, 2016

(87) PCT Pub. No.: WO2015/198823
PCT Pub. Date: Dec. 30, 2015

(65) Prior Publication Data
US 2017/0152779 A1    Jun. 1, 2017

(30) Foreign Application Priority Data

Jun. 23, 2014 (JP) ................. 2014-128095

(51) Int. Cl.
*F01N 3/00* (2006.01)
*F01N 3/20* (2006.01)
(Continued)

(52) U.S. Cl.
CPC ............. *F01N 3/206* (2013.01); *F01N 3/035* (2013.01); *F01N 3/08* (2013.01); *F01N 3/0814* (2013.01);
(Continued)

(58) Field of Classification Search
CPC ... F01N 3/08; F01N 3/36; F01N 3/035; F01N 3/105; F01N 3/206; F02D 41/10
(Continued)

(56) References Cited

U.S. PATENT DOCUMENTS 6,209,317 B1    4/2001  Hirota
6,311,484 B1    11/2001 Roth et al.
(Continued)

FOREIGN PATENT DOCUMENTS

EP    1627137 A1    2/2006
EP    2305980 A1    4/2011
(Continued)

OTHER PUBLICATIONS

Extended European Search Report for related European Patent Application No. 15811554.3, dated Jan. 3, 2018; 10 pages.
(Continued)

*Primary Examiner* — Jason D Shanske
(74) *Attorney, Agent, or Firm* — Procopio, Cory, Hargreaves & Savitch LLP (57) ABSTRACT

An exhaust gas cleaning system for an internal combustion engine is provided with, in an exhaust passage of an internal combustion engine and in order from an upstream side: a hydrocarbon supply unit; an upstream side catalyst unit of an oxidation catalyst, a NOx reduction catalyst, or the like; and a catalyst-equipped fine particle collection filter having a hydrocarbon adsorption function, wherein when a vehicle on which the engine is mounted accelerates after driving for a preset set time period at a temperature of exhaust gas equal to or less than a preset set exhaust gas temperature, the supply of hydrocarbon into the exhaust gas is started when an exhaust gas temperature becomes equal to or more than
(Continued)

a preset first set temperature, and the supply of hydrocarbon is terminated when a preset termination condition is satisfied.

6 Claims, 2 Drawing Sheets

(51) Int. Cl.
| | | |
|---|---|---|
| *F01N 3/08* | (2006.01) | |
| *F01N 3/24* | (2006.01) | |
| *F01N 3/36* | (2006.01) | |
| *F02D 41/10* | (2006.01) | |
| *F01N 3/035* | (2006.01) | |
| *F01N 3/10* | (2006.01) | |
| *F01N 9/00* | (2006.01) | |
| *F01N 13/00* | (2010.01) | |

(52) U.S. Cl.
CPC ......... *F01N 3/0821* (2013.01); *F01N 3/0835* (2013.01); *F01N 3/0871* (2013.01); *F01N 3/101* (2013.01); *F01N 3/105* (2013.01); *F01N 3/208* (2013.01); *F01N 3/2066* (2013.01); *F01N 3/24* (2013.01); *F01N 3/36* (2013.01); *F01N 9/00* (2013.01); *F01N 13/009* (2014.06); *F02D 41/10* (2013.01); *F01N 2250/02* (2013.01); *F01N 2560/06* (2013.01); *F01N 2570/14* (2013.01); *F01N 2590/08* (2013.01); *F01N 2610/03* (2013.01); *F01N 2610/146* (2013.01); *F01N 2900/0422* (2013.01); *F01N 2900/08* (2013.01); *F01N 2900/10* (2013.01); *F01N 2900/1404* (2013.01); *F01N 2900/1602* (2013.01); *F01N 2900/1622* (2013.01); *F01N 2900/1626* (2013.01); *Y02A 50/2324* (2018.01); *Y02A 50/2325* (2018.01); *Y02A 50/2344* (2018.01); *Y02T 10/22* (2013.01); *Y02T 10/24* (2013.01); *Y02T 10/47* (2013.01)

(58) Field of Classification Search
USPC ........................................................ 60/274
See application file for complete search history.

(56) References Cited

U.S. PATENT DOCUMENTS

| | | | |
|---|---|---|---|
| 8,561,396 B2 * | 10/2013 | Nagaoka | .................. F01N 3/02 422/170 |
| 2007/0119152 A1 | 5/2007 | Gieshoff et al. | |
| 2008/0098729 A1 | 5/2008 | Toshioka et al. | |
| 2011/0072806 A1 | 3/2011 | Nagaoka et al. | |

FOREIGN PATENT DOCUMENTS

| | | |
|---|---|---|
| JP | H06-257487 A | 9/1994 |
| JP | H11-324661 A | 11/1999 |
| JP | 2001-241321 A | 9/2001 |
| JP | 2004-150296 A | 5/2004 |
| JP | 2007-505264 A | 3/2007 |
| JP | 2009-002179 A | 1/2009 |
| JP | 2010-007524 A | 1/2010 |
| JP | 2010007514 | 1/2010 |

OTHER PUBLICATIONS

International Search Report and Written Opinion for PCT App No. PCT/JP2015/066189 dated Sep. 1, 2015, 8 pgs.
First Office Action for related CN App No. 201580033862.7 dated Jul. 20, 2017, 17 pgs.

* cited by examiner

EXHAUST GAS CLEANING SYSTEM FOR INTERNAL COMBUSTION ENGINE AND EXHAUST GAS CLEANING METHOD FOR INTERNAL COMBUSTION ENGINE

CROSS-REFERENCE TO RELATED APPLICATIONS

This application is a U.S. National Stage entry of PCT Application No. PCT/JP2015/066189, filed on Jun. 4, 2015, which claims priority to JP App No: 2014-128095, filed Jun. 23, 2014. The contents of the foregoing are incorporated by reference.

TECHNICAL FIELD

The present invention relates to an exhaust gas cleaning system for an internal combustion engine and an exhaust gas cleaning method for an internal combustion engine for reducing NOx released from an internal combustion engine by making use of a hydrocarbon adsorption function of a catalyst equipped particulate trapping filter.

BACKGROUND ART

An internal combustion engine such as a diesel engine or a lean-burn gasoline engine includes an exhaust gas cleaning system which is provided along an exhaust passageway to dean exhaust gas. The exhaust gas cleaning system includes a NOx reducing catalyst such as a NOx occlusion reduction catalyst or selective reduction catalyst (SCR catalyst) for reducing NOx in exhaust gases and a particulate trapping filter for trapping particulate materials (PM) in exhaust gases.

In relation to cleaning of NOx, there is a problem that the amount of NOx is increased temporarily when a vehicle with an internal combustion engine is accelerated from a low-speed and low-load operating condition. Namely, when the vehicle with the internal combustion engine is accelerated from a state in which the vehicle continues to be driven with the internal combustion engine run in the low-speed and low-load condition and the temperature of the NOx reducing catalyst of the exhaust gas cleaning system remains equal to or lower than the activating temperature, the amount of fuel injected increases due to the acceleration and the combustion temperature within cylinders is increased, whereby the amount of NOx discharged from the cylinders is increased temporarily in association with the acceleration. However, since the NOx reducing catalyst is not activated, much of NOx generated passes through the NOx reducing catalyst without being cleaned.

This problem becomes particularly serious with trucks driven in urban areas, because in these trucks, the temperature of exhaust gases at idling is low and the trucks continue to be driven in the low-speed and low-load driving condition which makes it difficult for the NOx reducing catalyst to be activated.

In the exhaust gas cleaning system which is also referred to as a post treating system, however, when attempting to improve the NOx cleaning rate by devising the configuration of the NOx reducing catalyst or improving the performance thereof, there is caused a problem that the configuration of an injection device for injecting a reducing agent for reducing NOx or the configuration of the catalyst becomes complex. Further, since an expensive noble or precious metal is used for the NOx reducing catalyst, when attempting to improve the NOx cleaning rate by increasing the amount of such a precious metal to be used, there is caused a problem that the costs are increased.

On the other hand, in treating to clean exhaust gases released from an internal combustion engine, as described, for example, in JP-A-2009-002179 and JP-A-2001-241321, a hydrocarbon adsorbing catalyst is known in which hydrocarbons (HC) in exhaust gases are physically adsorbed by a zeolite-based adsorbing catalyst when the temperature of the exhaust gases is low, while the hydrocarbons adsorbed are released when the temperature of the exhaust gases is high.

CITATION LIST

Patent Literature

Patent Literature 1: JP-A-2009-002179
Patent Literature 2: JP-A-2001-241321

SUMMARY OF INVENTION

Technical Problem

In relation to the countermeasures against the temporary increase in the amount of NOx generated resulting from the acceleration of a vehicle equipped with an internal combustion engine from a low-speed and low-load steady-state driving where the temperature of exhaust gases is low, the inventor of the invention applied for patent by this patent application has obtained the knowledge that even with a conventional exhaust gas cleaning system, by devising the design and control thereof, a 20% reduction of the amount of NOx discharged to the rear of the exhaust gas cleaning system is possible by making use of a particulate trapping filter in which a catalyst having a catalyst composition configured to strengthen the HC adsorbing function (in which, for example, an adsorbing material such as ceria or zeolite having the HC adsorbing function is used much) is loaded. The inventor has also carried out experiments to verify that the knowledge obtained is correct from the results of measuring constituents of exhaust gases ahead of and behind the catalyst loaded particulate trapping filter.

At the same time, the inventor has obtained the knowledge that the deteriorated fuel economy resulting from the addition of hydrocarbons in the control then is suppressed to an inconsiderable level because the addition of hydrocarbons in the control is limited only to the period of time when the vehicle is accelerated.

The invention has been made in view of these situations, and an object thereof is to provide an exhaust gas cleaning system for an internal combustion engine and an exhaust gas cleaning method for an internal combustion engine which can reduce NOx discharged from an internal combustion engine equipped on a vehicle when the amount of generation of NOx is increased temporarily as a result of the vehicle being accelerated from a low-speed and low-load steady-state driving where the temperature of exhaust gases is low.

Means for Solving the Problem

Solution to Problem

With a view to achieving the object, according to the invention, there is provided an exhaust gas cleaning system for an internal combustion engine including an upstream-side catalyst unit loaded with an oxidation catalyst or a NOx reducing catalyst and a catalyst loaded particulate trapping filter disposed downstream of the upstream-side catalyst unit in an exhaust passageway of the internal combustion engine and also including a hydrocarbon supply unit for supplying hydrocarbons to exhaust gases flowing into the upstream-side catalyst unit and a control unit which controls the hydrocarbon supply unit, characterized in that the catalyst loaded particulate trapping filter is provided with a hydrocarbon adsorption function to adsorb hydrocarbons when the temperature of the catalyst loaded particulate trapping filter is lower than a hydrocarbon releasing temperature and to release the adsorbed hydrocarbons when the temperature of the catalyst loaded particulate filter is equal to or higher than the hydrocarbon releasing temperature, and in that when a vehicle equipped with the internal combustion engine is accelerated after the vehicle has continued to be driven for a preset period of time with the temperature of exhaust gases remaining equal to or lower than a preset set exhaust gas temperature, the control unit controls the hydrocarbon supply unit so that the hydrocarbon supply unit starts supplying hydrocarbons into exhaust gases when the temperature of exhaust gases reaches or exceeds a preset first set temperature and terminates the supply of hydrocarbons when a preset terminating condition is met.

The hydrocarbon releasing temperature is, for example, in a range of 200° C. to 300° C., and the set exhaust gas temperature is a temperature at which the catalyst of the upstream-side catalyst unit is not activated or, for example, a temperature which is equal to or lower than an HC light-off temperature (for example, 200° C.) of the catalyst of the upstream-side catalyst unit. A set time for determining the time during which the vehicle is driven at the low exhaust gas temperature is, for example, on the order of 600 seconds to 1200 seconds. The first set temperature is a temperature at which the catalyst of the upstream-side catalyst unit reaches the HC light-off temperature and may be set at the same temperature as the set exhaust gas temperature. However, the set exhaust gas temperature is set at a temperature which is equal to or lower than the first set temperature.

According to the configuration described above, the temperature of the catalyst of the upstream-side catalyst unit has not yet reached the HC light-off temperature immediately after the temperature of exhaust gases starts to rise as a result of the acceleration of the vehicle to reach or exceed the first set temperature and is hence not activated sufficiently. Therefore, the hydrocarbons supplied into the exhaust gases passes through the upstream-side catalyst unit and flows into the catalyst loaded particulate trapping filter. The temperature of the catalyst loaded particulate trapping filter is, for example, on the order of 100° C. when the temperature of exhaust gases is so increased and has not yet reached the HC releasing temperature. Therefore, the hydrocarbons which flowed into the catalyst loaded particulate trapping filter are adsorbed.

On the other hand, the in-cylinder combustion temperature is raised by the acceleration of the vehicle, and the amount of NOx in exhaust gases is also increased. As this occurs, the temperature of the catalyst loaded particulate trapping filter is also increased to be equal to or higher than the hydrocarbon releasing temperature when the amount of NOx is most increased, whereby the adsorbed hydrocarbons are released. Then, the exhaust gases which pass through the catalyst loaded particulate trapping filter are put into the stoichiometric state by making use of the hydrocarbons so released and further adjusting the amount of intake air or supplying additionally hydrocarbons, whereby a reducing atmosphere is provided. This converts through reduction NOx into nitrogen and water by the action of the three-way catalytic function of the oxidation catalyst loaded in the catalyst loaded particulate trapping filter, thereby making it possible to reduce the amount of release of NOx on the downstream side of the exhaust gas cleaning system.

Namely, by making use of the fact that the temperature of the catalyst loaded particulate trapping filter (CSF) rises after the temperature of the pre-set oxidation catalyst (a pre-set DOC) or NOx reducing catalyst (the deNOx catalyst) of the upstream-side catalyst unit rises, the hydrocarbons are caused to be adsorbed before the temperature of the catalyst loaded particulate trapping filter is raised to the hydrocarbon releasing temperature, while the adsorbed hydrocarbons are caused to be released in synchronism with the timing at which NOx is increased in association with the acceleration of the vehicle to thereby remove NOx in the exhaust gases through reduction, whereby the NOx reducing effect is obtained.

In the case of a lean NOx trap catalyst (LINT) such as a NOx occlusion reduction catalyst being used as the NOx reducing catalyst, NOx is released from a NOx occlusion material of the lean NOx trap catalyst by the hydrocarbons supplied into the exhaust gases, and therefore, the amount of NOx which is released at the time of rich reduction in the recovery control to recover the NOx occlusion capability of the lean NOx trap catalyst is reduced, whereby the NOx slip amount reducing effect is obtained.

In the exhaust gas cleaning system for an internal combustion engine described above, when the control unit controls the hydrocarbon supply unit so that the hydrocarbon supply unit supplies hydrocarbons into exhaust gases through a plurality of times of pulse injection, a large amount of hydrocarbons is supplied within a short period of time at the time of pulse injection to put the environments of the catalyst of the upstream-side catalyst unit and the catalyst of the catalyst loaded particulate trapping filter in the stoichiometric state, whereby the reduction of NOx can be promoted by the three-way catalytic actions of these catalysts.

On this pulse injection, although depending upon the type of the internal combustion engine and the arrangement of the respective constituent elements of the exhaust gas cleaning system, hydrocarbons are injected, for example, 0.5 second to 2.0 seconds, and the injection of hydrocarbons is stopped 10 seconds to 60 seconds. The time from the start to termination of supply of hydrocarbons into exhaust gases is, for example, on the order of 70 seconds to 200 seconds.

In the exhaust gas cleaning system for an internal combustion engine described above, the control unit determines that the terminating condition is put into effect when the temperature of the catalyst loaded particulate trapping filter reaches the hydrocarbon releasing temperature. When the temperature of the catalyst is measured, "when the temperature of the catalyst loaded particulate trapping filter reaches the hydrocarbon releasing temperature" means when the temperature measured exceeds the hydrocarbon releasing temperature. However, when it is difficult to measure the temperature of the catalyst, the point in time when the temperature of the catalyst loaded particulate trapping filter exceeds the hydrocarbon releasing time is estimated from the temperature of exhaust gases which have passed through the catalyst loaded particulate trapping filter so that, for example, the point in time when the temperature of the catalyst loaded particulate trapping filter exceeds the hydrocarbon releasing time is referred to as "when the temperature of the catalyst loaded particulate trapping filter exceeds the hydrocarbon releasing temperature."

Alternatively, in the exhaust gas cleaning system for an internal combustion engine described above, the control unit determines that the terminating condition is put into effect when the supply amount reaches a preset supply amount. This preset supply amount unit an adsorbable amount of hydrocarbons which can be adsorbed by the catalyst loaded particulate trapping filter from the point in time when the temperature of the catalyst reaches the first set temperature to the point in time when the temperature of the catalyst loaded particulate trapping filter reaches the hydrocarbon releasing temperature. However, this adsorbable amount, that is, the preset supply amount can be obtained in advance through experiments or the like.

In the exhaust gas cleaning system for an internal combustion engine described above, the shape, length and heat dissipation amount of an exhaust passageway between the upstream-side catalyst unit and the catalyst loaded particulate trapping filter and the material and shape of the catalyst loaded particulate trapping filter are adjusted so that with the temperature of exhaust gases flowing into the upstream-side catalyst unit maintained at the first set temperature, a time spent until the temperature of the catalyst loaded particulate trapping filter exceeds the hydrocarbon releasing temperature is in a range of 50 seconds to 150 seconds.

By setting this time at the range of 50 seconds to 150 seconds or, preferably, at a range of 90 seconds to 110 seconds, the timing at which a large amount of NOx generated as a result of the acceleration of the vehicle reaches the catalyst loaded particulate trapping filter can be made to concur with the timing at which the NOx adsorbed to the catalyst loaded particulate trapping filter are released therefrom, thereby making it possible to increase the NOx reducing effect without involving any complex hydrocarbon supply operation.

Then, with a view to achieving the object, there is provided an exhaust gas cleaning method for an internal combustion engine including an upstream-side catalyst unit loaded with an oxidizing catalyst or a NOx reducing catalyst and a catalyst loaded particulate trapping filter disposed downstream of the upstream-side catalyst unit in an exhaust passageway of the internal combustion engine and also including a hydrocarbon supply unit for supplying hydrocarbons to exhaust gases flowing into the upstream-side catalyst unit and a control unit which controls the hydrocarbon supply unit, characterized by providing the catalyst loaded particulate trapping filter with a hydrocarbon adsorption function to adsorb hydrocarbons when the temperature of the catalyst loaded particulate trapping filter is lower than a hydrocarbon releasing temperature and to release the adsorbed hydrocarbons when the temperature of the catalyst loaded particulate filter is equal to or higher than the hydrocarbon releasing temperature, and when a vehicle equipped with the internal combustion engine is accelerated after the vehicle has continued to be driven for a preset period of time with the temperature of exhaust gases remaining equal to or lower than a preset set exhaust gas temperature, supplying hydrocarbons into exhaust gases when the temperature of exhaust gases reaches or exceeds a preset first set temperature and terminating the supply of hydrocarbons when a preset terminating condition is met. This exhaust gas cleaning method for an internal combustion engine can provide a similar advantageous effect to that provided by the exhaust gas cleaning system for an internal combustion engine described above.

Advantageous Effect of the Invention

According to the exhaust gas cleaning system for an internal combustion engine and the exhaust gas cleaning method for an internal combustion engine of the invention, the catalyst loaded particulate trapping filter which traps particulate matters for re-combustion is provided with the hydrocarbon adsorption function, and the supply of hydrocarbons into exhaust gases is executed at an appropriate timing by making use of the delay between the timing at which the temperature of the upstream-side catalyst unit which is made up of the pre-set oxidation catalyst or the NOx reducing catalyst is raised and the timing at which the temperature of the catalyst loaded particulate trapping filter is raised, whereby the catalyst loaded particulate trapping filter is made to adsorb hydrocarbons and to release the adsorbed hydrocarbons when the amount of NOx is increased in association with the acceleration of the vehicle to exhibit the NOx reducing effect by the hydrocarbons. Thus, the amount of NOx released from the internal combustion engine can be reduced without addition of an effective NOx post-treatment device.

DESCRIPTION OF EMBODIMENTS

Figure 1:
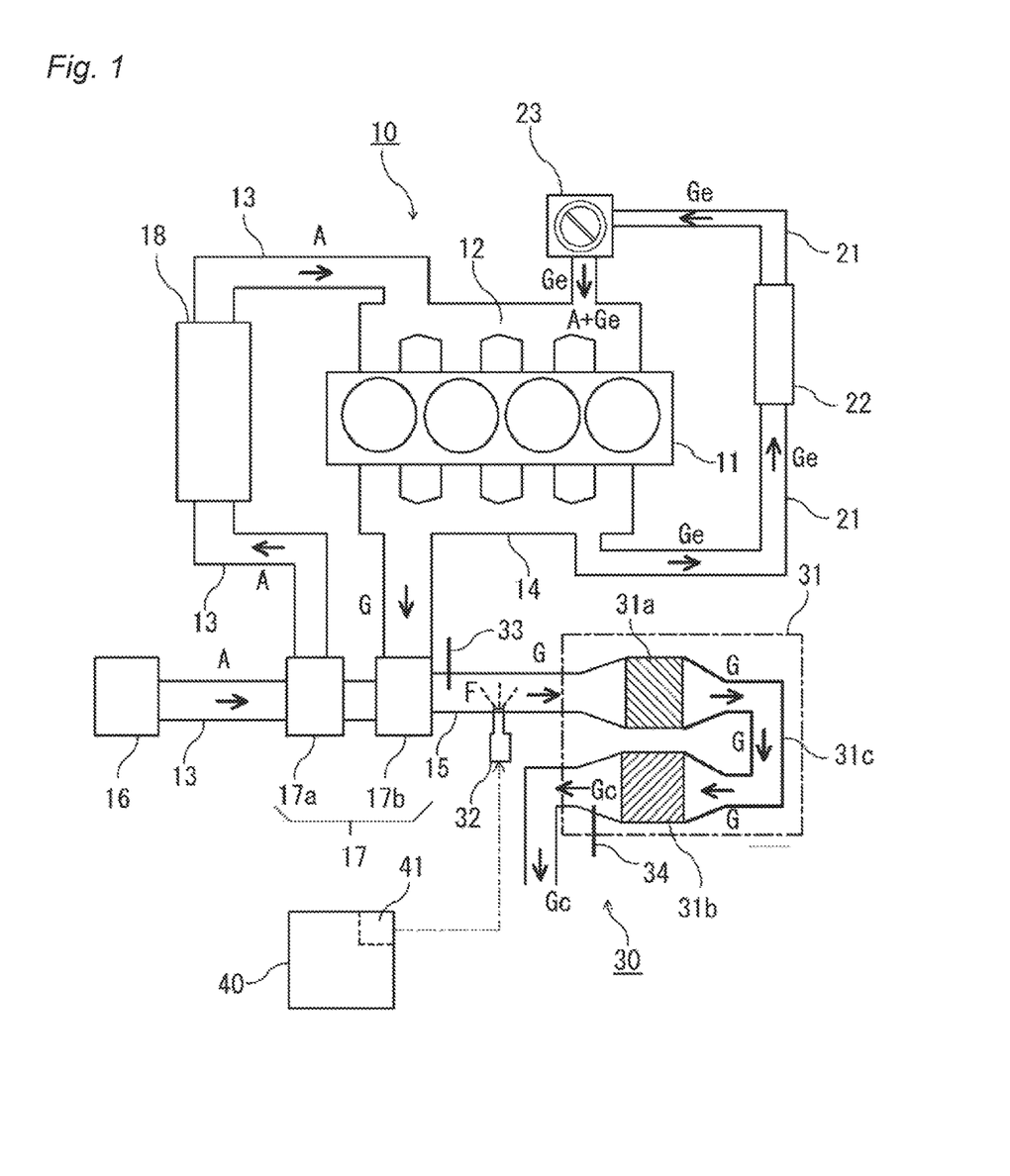
FIG. 1 is a schematic diagram showing schematically the configuration of an exhaust gas cleaning system for an internal combustion engine according to an embodiment of the invention.

Hereinafter, referring to the drawings, an exhaust gas cleaning system and an exhaust gas cleaning method according to an embodiment of the invention will be described. As shown in FIG. 1, an exhaust gas cleaning system 30 for an internal combustion engine according to an embodiment of the invention is provided on an engine (an internal combustion engine) 10 which includes an engine main body 11, an intake passageway 13 and an exhaust passageway 15.

An air cleaner 16, a compressor 17a of a turbocharger 17 and an intercooler 18 are provided sequentially in that order from an upstream side along the intake passageway 13 which connects to an intake manifold 12 of the engine main body 11. A turbine 17b of the turbocharger 17, a hydrocarbon injection device 32 and an exhaust emission control device 31 are provided sequentially in that order form the upstream side on the exhaust passageway 15 which connects to an exhaust manifold 14 of the engine main body 11.

An EGR passageway 21 is provided which connects the intake manifold 12 to the exhaust manifold 14. This EGR passageway 21 includes an EGR cooler 22 and an EGR valve 23 which are provided sequentially in that order from the upstream side to thereby control the cooling and the flow rate of EGR gas Ge.

Then, in the exhaust gas cleaning system 30 for an internal combustion engine, the exhaust emission control device 31 in which an upstream-side catalyst unit 31a and a catalyst loaded particulate trapping filter (CSF) 31b are disposed sequentially in that order from the upstream side is disposed along the exhaust passageway 15 to treat to control NOx (oxides of nitrogen), PM (particulate matters) and the like which are contained in exhaust gases G resulting from a combustion reaction within the cylinder main body 11. The exhaust gas cleaning system 30 for an internal combustion engine includes the hydrocarbon injection device (the hydrocarbon supply unit) 32 which supplies hydrocarbons (HC) into exhaust gases G which flow into the upstream-side catalyst unit 31a is provided on the exhaust passageway 15 which lies on an upstream side of the upstream-side catalyst unit 31a and a control unit 41, (e.g., an electronic control unit (ECU)), which controls the hydrocarbon injection device 32.

Although the exhaust pipe direct injection system is described as an example in which hydrocarbons such as fuel are injected directly into exhaust gases G in the exhaust passageway 15, fuel may be supplied into exhaust gases G which flow into the exhaust passageway 15 through post injection in a in-cylinder fuel injection control.

The upstream-side catalyst unit 31a is made up of a pre-set oxidation catalyst device (a pre-set DOC) or a NOx reducing catalyst. As this NOx reducing catalyst device, there is raised a lean NOx trap catalyst (LNT catalyst) device such as a NOx occlusion reduction catalyst, hydrocarbon-selective reduction catalyst (HC-SCR) catalyst or the like.

The catalyst loaded particulate trapping filter 31b is made up by loading an oxidation catalyst and a hydrocarbon adsorbing catalyst in a particulate trapping filter called a diesel particulate filter.

This particulate trapping filter is formed of a cordierite material or a silicon carbide (SiC) material, and a thin ceramic wall is used as a filter by closing both ends of a honeycomb ceramic cell in an alternating fashion. Since this particulate trapping filter has a superior heat resistance, trapped particulate matters (PM) can be removed by burning the trapped PM by heating hem at the time of PM reproduction, and the trapping performance can be maintained by this PM reproduction process. PM can be burnt more easily by loading the oxidation catalyst in the particulate trapping filter.

The oxidation catalyst is a catalyst having a function to oxidize hydrocarbon or the like with a noble metal such as platinum or palladium. The hydrocarbon adsorbing catalyst is a catalyst which provides the hydrocarbon adsorption function to adsorb hydrocarbons at low temperatures, that is, a temperature which is lower than a hydrocarbon releasing temperature T2 but to release the adsorbed hydrocarbons at a temperature which is equal to or higher than the hydrocarbon releasing temperature T2 with the catalyst loaded particulate trapping filter 31b.

This hydrocarbon adsorbing catalyst can be formed of a zeolite constituent. As this zeolite constituent, for example, mordenite, ZSM-5, USY, MFI-type zeolite or β-zeolite is known, and these can be used alone or can be combined arbitrarily for use. By using this hydrocarbon adsorbing catalyst, hydrocarbons can be adsorbed when the catalyst is at low temperatures, while when the catalyst is equal to or higher than the hydrocarbon releasing temperature (for example, temperatures in a range of 200° C. to 300° C.), the adsorbed hydrocarbons can be released from the catalyst.

Then, a first exhaust gas temperature sensor 33 is disposed upstream of the upstream-side catalyst unit 31a to measure a temperature Tg1 of exhaust gases G which flow into the upstream-side catalyst unit 31a, and a second exhaust gas temperature sensor 34 is disposed downstream of the catalyst loaded particulate trapping filter 31b to measure a temperature Tg2 of exhaust gases G which flow out of the catalyst loaded particulate trapping filter 31b.

Then, the control unit 41 is configured to execute the following control. Namely, this control unit 41 determines whether or not a vehicle equipped with the engine 10 is accelerated after the vehicle has continued to be driven for a preset set period of time to with the temperature T0 of exhaust gases G which is detected by the first exhaust gas temperature sensor 33 remaining equal to or lower than a preset set exhaust gas temperature T0. Then, in case the control unit 41 determines that the vehicle is so accelerated, the control unit 41 controls the hydrocarbon injection device 32 so that the hydrocarbon injection device 32 starts supplying hydrocarbons into the exhaust gases G when the exhaust gas temperature Tg1 becomes equal to or higher than a first set temperature T1 and terminates the supply of hydrocarbons when a preset terminating condition is met.

This control unit 41 is normally incorporated in an overall system control unit 40 which executes an overall control of the engine 10 and an overall control of the vehicle equipped with this engine 10.

This set exhaust gas temperature T0 is a temperature at which a catalyst of the upstream-side catalyst unit 31a is not activated and is, for example, a temperature which is equal to or lower than an HC light-off temperature (for example, 200° C.) of the catalyst of the upstream-side catalyst unit 31a. The set period of time to for determining on the time during which the vehicle continues to be driven with the engine 10 staying in a low-speed and low-load operating state and the temperature Tg1 of the exhaust gases G remaining low is, for example, on the order of 600 seconds to 1200 seconds. The first set temperature T1 is a temperature corresponding to the HC light-off temperature of the catalyst of the upstream-side catalyst unit 31a. Although the first set temperature T1 may be set at a temperature which is the same as the set exhaust gas temperature T0, the first set temperature T1 is a temperature which is equal to or higher than the set exhaust gas temperature T0.

As the terminating condition, a condition that a temperature Tb of the catalyst loaded particulate trapping filter 31b reaches the hydrocarbon releasing temperature T2 or a condition that the amount of supply of hydrocarbons reaches a preset supply amount can be adopted.

When the temperature of the catalyst of the catalyst loaded particulate trapping filter 31b is measured, the temperature Tb of the catalyst loaded particulate trapping filter 31b is determined to reach the hydrocarbon releasing temperature T2 when the temperature of the catalyst of the catalyst loaded particulate trapping filter 31b exceeds the hydrocarbon releasing temperature. Normally, however, it is difficult to measure the temperature of a catalyst, and therefore, in such a case, the control continues based on the understanding that the temperature of the catalyst loaded particulate trapping filter 31b exceeds the hydrocarbon releasing temperature T2 when the temperature Tg2 of exhaust gases which pass through the catalyst loaded particulate trapping filter 31b exceeds the hydrocarbon releasing temperature T2.

This preset supply amount is referred to as an adsorbable amount of hydrocarbons which can be adsorbed by the catalyst loaded particulate trapping filter 31b from the point in time when the temperature Tg1 of the exhaust gases G reaches the first set temperature T1 to the point in time when the temperature Tb of the catalyst loaded particulate trapping filter 31b reaches the hydrocarbon releasing temperature T2. However, this adsorbable amount, that is, the preset supply amount can be obtained in advance through experiments or the like.

Then, it is preferable that hydrocarbons are supplied into exhaust gases G through a plurality of times of pulse injection. By adopting the pulse injection, since a large amount of hydrocarbons are supplied within a short period of time through an injection, the environments of the catalyst of the upstream-side catalyst unit 31a and the catalyst of the catalyst loaded particulate trapping filter 31b are put into a stoichiometric state, and the reduction of NOx can be promoted remarkably by the three-way catalytic actions of these catalysts.

Although depending upon the type of the engine 10 and the arrangement of the upstream-side catalyst unit 31a and the catalyst loaded particulate trapping filter 31b, hydrocarbons are injected, for example, 0.5 second to 2.0 seconds, and the injection of hydrocarbons is stopped 10 seconds to 60 seconds. The time from the start to termination of injection of hydrocarbons into exhaust gases G is, for example, on the order of 70 seconds to 200 seconds.

Preferably, the shape, length and heat dissipation amount of an exhaust passageway 31c between the upstream-side catalyst unit 31a and the catalyst loaded particulate trapping filter 31b and the material and shape of the catalyst loaded particulate trapping filter 31b are determined so that with the temperature Tg1 of exhaust gases G flowing into the upstream-side catalyst unit 31a maintained at the first set temperature T1, a time spent until the temperature of the catalyst loaded particulate trapping filter 31b exceeds the hydrocarbon releasing temperature T2 is in a range of 50 seconds to 150 seconds.

By setting this time at the range of 50 seconds to 150 seconds or, preferably, at a range of 90 seconds to 110 seconds, the timing at which a large amount of NOx generated as a result of the acceleration of the vehicle reaches the catalyst loaded particulate trapping filter 31b can be made to concur with the timing at which the NOx adsorbed to the catalyst loaded particulate trapping filter 31b are released therefrom, thereby making it possible to increase the NOx reducing effect without involving any complex hydrocarbon supply operation.

In general, compared with a particulate trapping filter of silicon carbide, a particulate trapping filter of cordierite has a lighter specific gravity, a smaller heat capacity and a superior temperature rising property and is suitable for continuous reproduction. However, in this application, it is preferable that the particulate trapping filter of silicon carbide having the greater heat capacity and inferior temperature rising property is used. Then, when the catalyst loaded particulate trapping filter 31b is formed by loading therein the oxidation catalyst and the hydrocarbon adsorbing catalyst, a period of time during which hydrocarbons are adsorbed can be extended so as to adsorb more hydrocarbons. Namely, the time during which hydrocarbons are adsorbed to the catalyst loaded particulate trapping filter 31b is ensured sufficiently while the temperature of the upstream-side catalyst unit 31a is raised, which is more preferable.

Then, the exhaust gas cleaning method for an internal combustion engine according to the embodiment of the invention is an exhaust gas cleaning method for the engine (the internal combustion engine) 10 which includes the upstream-side catalyst unit 31a made up of the oxidation catalyst or the NOx reducing catalyst and the catalyst loaded particulate trapping filter 31b disposed downstream of the upstream-side catalyst unit 31a along the exhaust passage 15 of the engine 10 and also includes the hydrocarbon injection device (the hydrocarbon supply unit) 32 which supplies hydrocarbons into exhaust gases G flowing into the upstream-side catalyst unit 31a and the control unit 41 which controls the hydrocarbon supply unit 32. The exhaust gas cleaning method is as follows.

The hydrocarbon loaded particulate trapping filter 31b is provided with the hydrocarbon adsorption function to adsorb hydrocarbons when the temperature Tb of the catalyst loaded particulate trapping filter 31b is lower than the hydrocarbon releasing temperature T2 and to release the adsorbed hydrocarbons when temperature Tb of the catalyst loaded particulate trapping filter 31b is equal to or higher than the hydrocarbon releasing temperature T2.

In addition, according to the exhaust gas cleaning method, when the vehicle equipped with the engine 10 is accelerated after the vehicle has continued to be driven for the preset set period of time to with the temperature Tg1 of exhaust gases G remaining equal to or lower than the preset set exhaust gas temperature T0, hydrocarbons are started to be supplied into the exhaust gases G when the exhaust gas temperature Tg1 becomes equal to or higher than the first set temperature T1 and the supply of hydrocarbons is terminated when the preset terminating condition is met.

According to the exhaust gas cleaning system 30 for an internal combustion engine and the exhaust gas cleaning method for an internal combustion engine of this embodiment, the temperature Tb of the catalyst of the upstream-side catalyst unit 31a has not yet reached the HC light-off temperature immediately after the temperature Tg1 of exhaust gases G starts to rise as a result of the acceleration of the vehicle to reach or exceed the first set temperature T1 and is hence not activated sufficiently. Therefore, the hydrocarbons supplied into the exhaust gases G passes through the upstream-side catalyst unit 31a and flows into the catalyst loaded particulate trapping filter 31b. When the temperature Tg1 of the exhaust gases G is raised, the temperature Tb of the catalyst loaded particulate trapping filter 31b is on the order of 100° C. and has not yet raised to the releasing temperature T2. Thus, the catalyst loaded particulate trapping filter 31b adsorbs the hydrocarbons which flow thereinto.

On the other hand, the in-cylinder combustion temperature is raised by the acceleration of the vehicle, and the amount of NOx in exhaust gases G is also increased. As this occurs, the temperature Tb of the catalyst loaded particulate trapping filter 31b is also raised, and the temperature Tb of the catalyst loaded particulate trapping filter 31b is raised to be equal to or higher than the hydrocarbon releasing temperature T2 when the amount of NOx is increased to a maximum level, whereby the adsorbed hydrocarbons are released. The exhaust gases G which pass through the catalyst loaded particulate trapping filter 31b is put in a reducing atmosphere by the hydrocarbons so released, and NOx is converted through reduction into nitrogen and water as a result of the oxidation catalyst loaded in the catalyst loaded particulate trapping filter 31b functioning as a three-way catalyst, thereby making it possible to reduce the amount of discharge of NOx downstream of the exhaust gas cleaning system 30. The resulting exhaust gases Gc from which NOx is removed are released to the atmosphere by way of a muffler (not shown) or the like.

Namely, by making use of the fact that the temperature Tb of the catalyst loaded particulate trapping filter (CSF) 31b rises after the temperature of the pre-set oxidation catalyst (a pre-set DOC) or NOx reducing catalyst (the deNOx catalyst) of the upstream-side catalyst unit 31a rises, the hydrocarbons are caused to be adsorbed before the temperature Tb of the catalyst loaded particulate trapping filter 31b is raised to the hydrocarbon releasing temperature T2, while the temperature Tb of the catalyst loaded particulate trapping filter 31b is raised to the hydrocarbon releasing temperature T2 in synchronism with the timing at which the amount of NOx is increased in association with the acceleration of the vehicle so as to release the adsorbed hydrocarbons to remove NOx in the exhaust gases G through reduction, whereby the NOx reducing effect can be obtained.

Consequently, according to the exhaust gas cleaning system 30 for an internal combustion engine and the exhaust gas cleaning method for an internal combustion engine which are configured as described above, the catalyst loaded particulate trapping filter (CSF) 31b which traps PM (particulate matters) for re-combustion is provided with the hydrocarbon adsorption function, and the supply of hydrocarbons into exhaust gases G is executed at an appropriate timing by making use of the delay between the timing at which the temperature of the upstream-side catalyst unit 31a which is made up of the pre-set oxidation catalyst or the NOx reducing catalyst is raised and the timing at which the temperature of the catalyst loaded particulate trapping filter 31b is raised, whereby the catalyst loaded particulate trapping filter 31b is made to adsorb hydrocarbons and to release the adsorbed hydrocarbons when the amount of NOx is increased in association with the acceleration of the vehicle to exhibit the NOx reducing effect by the hydrocarbons. Thus, the amount of NOx released from the engine 10 can be reduced without addition of an effective NOx post-treatment device.

Figure 2:
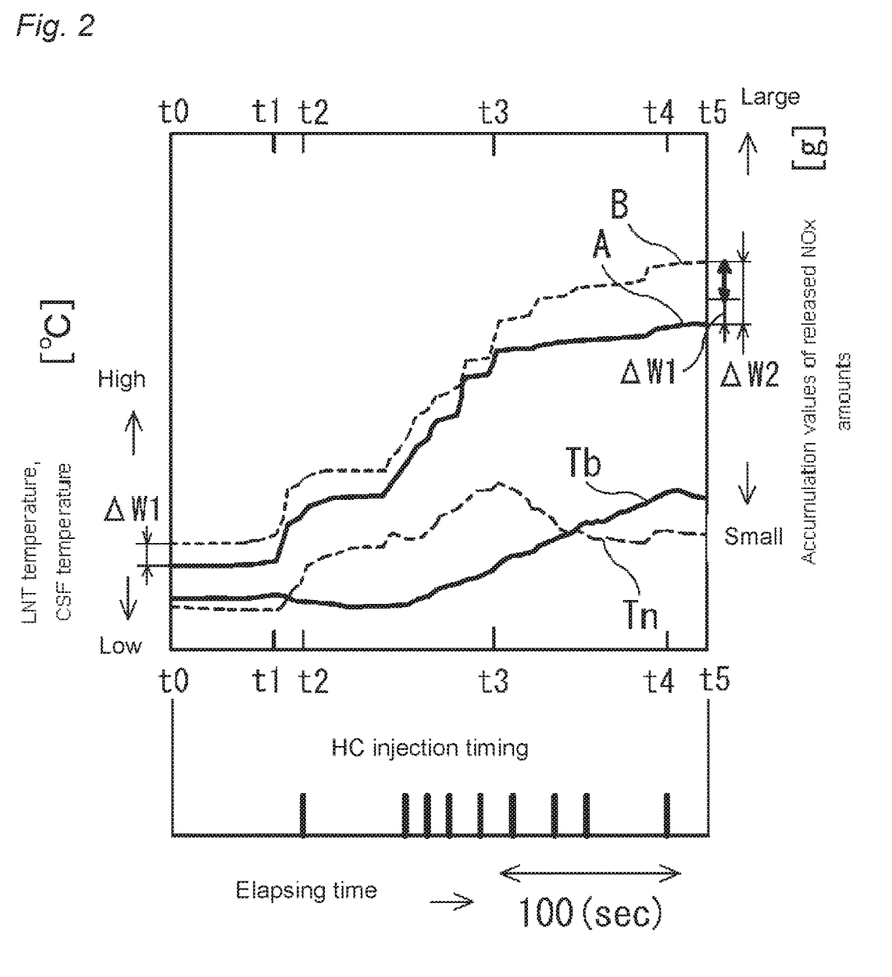
FIG. 2 is a graph illustrating a NOx reducing effect of a catalyst loaded particulate trapping filter.

When verifying this NOx reducing effect by reference to FIG. 2, the vehicle is accelerated (a point in time t1) after the vehicle has continued to be run through steady-state driving with the temperature Tg1 of exhaust gases G remaining low, the temperature Tg1 of the exhaust gases G is raised, and the temperature Tn of the lean NOx trap catalyst (LNT) which makes up the upstream-side catalyst unit 31a is gradually raised as the temperature Tg1 of the exhaust gases G is raised. On the other hand, the temperature Tb of the catalyst loaded particulate trapping filter 31b is gradually raised after the temperature Tn has started to be raised.

Hydrocarbons (HC) are injected through a plurality of times of pulse injection from a point in time (t2) when the temperature Tg1 of the exhaust gases G is raised to be equal to or higher than the first set temperature T1 to a point in time (t4) when the temperature Tb of the catalyst loaded particulate trapping filter 31b exceeds the hydrocarbon releasing temperature T2. The hydrocarbons supplied through the injection are adsorbed by the catalyst loaded particulate trapping filter 31b, however, part of the hydrocarbons so injected reduces NOx.

An accumulation value of the NOx amount on the upstream side of the catalyst loaded particulate trapping filter (CSF) 31b on which the control described above is carried out is denoted by A, and an accumulation value of the NOx amount on the downstream side is denoted by B. When looking at a difference between the accumulation value A of the NOx amount on the upstream side and the accumulation value B of the NOx amount on the downstream side, it is seen that the difference ΔW becomes greater near a point in time t3, and it is seen from this fact that the NOx reducing effect is taking place in the catalyst loaded particulate trapping filter (CST) 31b. A difference ΔW1 from a point in time t0 to the point in time t3 denotes a difference that has already taken place by the control carried out at a point in time, not shown in the graph because A and B denote the accumulation values.

Consequently, the NOx reduction amount in the catalyst loaded particulate trapping filter (CSF) 31b by the control shown in FIG. 2 becomes ΔW2−ΔW1, from which it is seen that the advantageous effect of the invention is verified through the experiment.

DESCRIPTION OF REFERENCE NUMERALS AND CHARACTERS 10 engine (internal combustion engine)
11 engine main body
30 exhaust gas cleaning system for internal combustion engine
31 exhaust emission control device
32 hydrocarbon injection device
30 exhaust gas cleaning system for internal combustion engine
31 exhaust emission control device
31a upstream-side catalyst unit
31b catalyst loaded particulate trapping filter (CSF)
31c exhaust gas passageway
32 hydrocarbon injection device (hydrocarbon supply unit)
33 first exhaust gas temperature sensor
34 second exhaust gas temperature sensor
40 overall system control unit
41 control unit
G exhaust gases
Gc exhaust gases from which NOx is removed through reduction
Ge EGR gas
Tn temperature of lean NOx trap catalyst (LNT)

The invention claimed is:

1. An exhaust gas cleaning system for an internal combustion engine comprising:
   an upstream-side catalyst unit loaded with an oxidizing catalyst or a NOx reducing catalyst, the upstream-side catalyst unit being disposed in an exhaust passageway of the internal combustion engine;
   a catalyst loaded particulate trapping filter disposed downstream of the upstream-side catalyst unit in the exhaust passageway; and
   an electronic control unit that controls a supply of hydrocarbons to exhaust gases flowing into the upstream-side catalyst unit,
   wherein the catalyst loaded particulate trapping filter is provided with a hydrocarbon adsorption function to adsorb hydrocarbons when the temperature of the catalyst loaded particulate trapping filter is lower than a hydrocarbon releasing temperature and to release the adsorbed hydrocarbons when the temperature of the catalyst loaded particulate filter is equal to or higher than the hydrocarbon releasing temperature,
   wherein the electronic control unit is configured to:
   determine when a vehicle equipped with the internal combustion engine has continued to be driven for a preset period of time with the temperature of exhaust gases remaining equal to or lower than a preset set exhaust gas temperature,
   when it has been determined that the vehicle has continued to be driven for the preset amount of time with the temperature of the exhaust gases remaining equal to or lower than the preset exhaust gas temperature, determine whether the vehicle is accelerated,
   when it is determined that the vehicle is accelerated, control the supply of hydrocarbons into exhaust gases when the temperature of exhaust gases reaches or exceeds a preset first set temperature, and
   terminate the supply of hydrocarbons when a preset terminating condition is met.

2. The exhaust gas cleaning system for an internal combustion engine according to claim 1,
   wherein the electronic control unit controls the supply of hydrocarbons into exhaust gases through a plurality of times of pulse injection.

3. The exhaust gas cleaning system for an internal combustion engine according to claim 1, wherein the electronic control unit determines that the terminating condition is put into effect when the temperature of the catalyst loaded particulate trapping filter reaches the hydrocarbon releasing temperature.

4. The exhaust gas cleaning system for an internal combustion engine according to claim 1,
wherein the electronic control unit determines that the terminating condition is put into effect when the supply amount reaches a preset supply amount.

5. The exhaust gas cleaning system for an internal combustion engine according to claim 1,
wherein the shape, length and heat dissipation amount of an exhaust passageway between the upstream-side catalyst unit and the catalyst loaded particulate trapping filter and the material and shape of the catalyst loaded particulate trapping filter are determined so that with the temperature of exhaust gases flowing into the upstream-side catalyst unit maintained at the first set temperature, a time spent until the temperature of the catalyst loaded particulate trapping filter exceeds the hydrocarbon releasing temperature is in a range of 50 seconds to 150 seconds.

6. An exhaust gas cleaning method for an internal combustion engine comprising:
an upstream-side catalyst unit loaded with an oxidizing catalyst or a NOx reducing catalyst, the upstream-side catalyst unit being disposed in an exhaust passageway of the internal combustion engine;
a catalyst loaded particulate trapping filter disposed downstream of the upstream-side catalyst unit in the exhaust passageway;
wherein the method comprises:
providing the catalyst loaded particulate trapping filter with a hydrocarbon adsorption function to adsorb hydrocarbons when the temperature of the catalyst loaded particulate trapping filter is lower than a hydrocarbon releasing temperature and to release the adsorbed hydrocarbons when the temperature of the catalyst loaded particulate filter is equal to or higher than the hydrocarbon releasing temperature,
determining when a vehicle equipped with the internal combustion engine has continued to be driven for a preset period of time with the temperature of exhaust gases remaining equal to or lower than a preset set exhaust gas temperature,
when it is determined that the vehicle has continued to be driven, determining whether the vehicle is accelerated,
supplying hydrocarbons into exhaust gases when the temperature of exhaust gases reaches or exceeds a preset first set temperature, and
terminating the supply of hydrocarbons when a preset terminating condition is met.

* * * * *